(12) United States Patent
Vaidyaraman et al.

(10) Patent No.: US 6,457,740 B1
(45) Date of Patent: Oct. 1, 2002

(54) VEHICLE OCCUPANT SAFETY APPARATUS (75) Inventors: Srinivasan Vaidyaraman, Rochester Hills; Ayad G. Nayef, Auburn Hills; Paul F. Altamore, Sterling Heights, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/099,707

(22) Filed: Jun. 19, 1998

(51) Int. Cl.$^7$ .............................................. B60R 21/22
(52) U.S. Cl. ..................................... 280/730.2; 280/749
(58) Field of Search ........................... 280/730.1, 730.2, 280/748, 749, 756, 728.2; 296/214

(56) References Cited

U.S. PATENT DOCUMENTS 2,834,606 A * 5/1958 Bertrand ................... 280/730.1
3,642,303 A    2/1972 Irish et al.

(List continued on next page.)

FOREIGN PATENT DOCUMENTS

| DE | 2628815 | 1/1978 | |
|---|---|---|---|
| DE | 4307175 | 9/1993 | |
| DE | 29616904 | 3/1997 | |
| DE | 19632222 | 2/1998 | |
| DE | 19650940 | 6/1998 | |
| EP | 0810128 | 12/1997 | |
| FR | 2667831 A1 * | 4/1992 | .............. 280/730.1 |
| GB | 2297950 | 8/1996 | |
| JP | 3276844 | 9/1991 | |
| JP | 9-254737 * | 9/1997 | |

OTHER PUBLICATIONS

U.S. application Ser. No. 09/040,857, filed Mar. 18, 1998.
Japanese Patent Public Disclosure No. HEI 10–119703, May 1998.
Research Disclosure (Mar. 1998) for Inflatable Roof Bladder for Rollover Protection.
Research Disclosure for Deployable Foam System for Rollover Protection, Mar. 1998.

*Primary Examiner*—Paul N. Dickson
*Assistant Examiner*—David R. Dunn
(74) *Attorney, Agent, or Firm*—Tarolli, Sundheim, Covell, Tummino & Szabo L.L.P.

(57) ABSTRACT

An apparatus (10) for helping to protect an occupant of a vehicle (12) having a roof (60) and a side structure (40) includes an inflatable device (16) having a deflated condition and having an inflated condition. In the inflated condition, a head portion (22) of the inflatable device is inflated between the occupant's head and the vehicle roof and a side portion (20) of the inflatable device is inflated between the occupant and the vehicle side structure. The apparatus (10) further includes an actuatable inflation fluid source (14) for upon actuation directing inflation fluid into the inflatable device (16) to inflate the inflatable device from the deflated condition to the inflated condition. The head portion (22) of the inflatable device (16) is inflated by inflation fluid flow in a direction transverse to the vehicle side structure (40). In a preferred embodiment, the head portion (22) of the inflatable device (16) when in the deflated condition has panels (86, 96) which lie generally parallel to a headliner (62) between the headliner and the roof (60) and which extend from the vehicle side (40) approximately to the vehicle centerline (64).

16 Claims, 5 Drawing Sheets

U.S. PATENT DOCUMENTS

| | | | |
|---|---|---|---|
| 3,664,682 A | * 5/1972 | Wycech | 280/730.1 |
| 3,753,576 A | * 8/1973 | Gorman | 280/730.1 |
| 3,795,412 A | 3/1974 | John | |
| 3,897,961 A | 8/1975 | Leising et al. | 280/730.1 |
| 4,966,388 A | 10/1990 | Warner et al. | 280/730 |
| 5,324,072 A | * 6/1994 | Olson et al. | 280/730.2 |
| 5,333,898 A | 8/1994 | Stutz | |
| 5,333,899 A | * 8/1994 | Witte | 280/730.2 |
| 5,362,097 A | 11/1994 | Barske | |
| 5,470,103 A | 11/1995 | Vaillancourt et al. | 280/730.1 |
| 5,486,019 A | 1/1996 | Chevrolet et al. | |
| 5,524,924 A | 6/1996 | Steffens, Jr. et al. | 280/730.2 |
| 5,536,038 A | * 7/1996 | Bollaert et al. | 280/730.2 |
| 5,540,459 A | 7/1996 | Daniel | |
| 5,556,128 A | 9/1996 | Sinnhuber et al. | |
| 5,575,497 A | 11/1996 | Suyama et al. | |
| 5,588,672 A | 12/1996 | Karlow et al. | |
| 5,602,734 A | 2/1997 | Kithil | |
| 5,605,346 A | 2/1997 | Cheung et al. | |
| 5,678,853 A | 10/1997 | Maly | |
| 5,755,457 A | * 5/1998 | Specht | 280/728.2 |
| 5,775,726 A | * 7/1998 | Timothy et al. | 280/730.1 |
| 5,797,621 A | * 8/1998 | Ono | 280/730.2 |
| 5,845,935 A | 12/1998 | Enders et al. | |
| 5,913,536 A | * 6/1999 | Brown | 280/730.2 |
| 5,988,735 A | * 11/1999 | Muller | 296/214 |
| 6,010,149 A | * 1/2000 | Riedel et al. | 280/730.2 |
| 6,056,316 A | * 5/2000 | Yamaji et al. | 280/730.2 |

* cited by examiner

VEHICLE OCCUPANT SAFETY APPARATUS

BACKGROUND OF THE INVENTION

The present invention relates to a vehicle occupant safety apparatus and, in particular, to a vehicle safety apparatus for helping to protect an occupant of a vehicle having a roof and a side structure.

SUMMARY OF THE INVENTION

The present invention is a vehicle occupant safety apparatus for helping to protect an occupant of a vehicle having a roof and a side structure. The apparatus includes an inflatable vehicle occupant protection device having a deflated condition and having an inflated condition in which a head portion of the inflatable device is inflated between the occupant's head and the vehicle roof and a side portion of the inflatable device is inflated between the occupant and the vehicle side structure. The apparatus further includes an actuatable inflation fluid source for, upon actuation, directing inflation fluid into the inflatable device to inflate the inflatable device from the deflated condition to the inflated condition. The head portion of the inflatable device is inflated by inflation fluid flow in a direction transverse to the vehicle side structure.

In one embodiment, the head portion of the inflatable device when in the deflated condition has panels which lie generally parallel to a headliner between the headliner and the roof and which extend from the vehicle side approximately to the vehicle centerline. The inflatable device comprises inner and outer panels each made from a single piece of fabric material.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figures 1, 10:
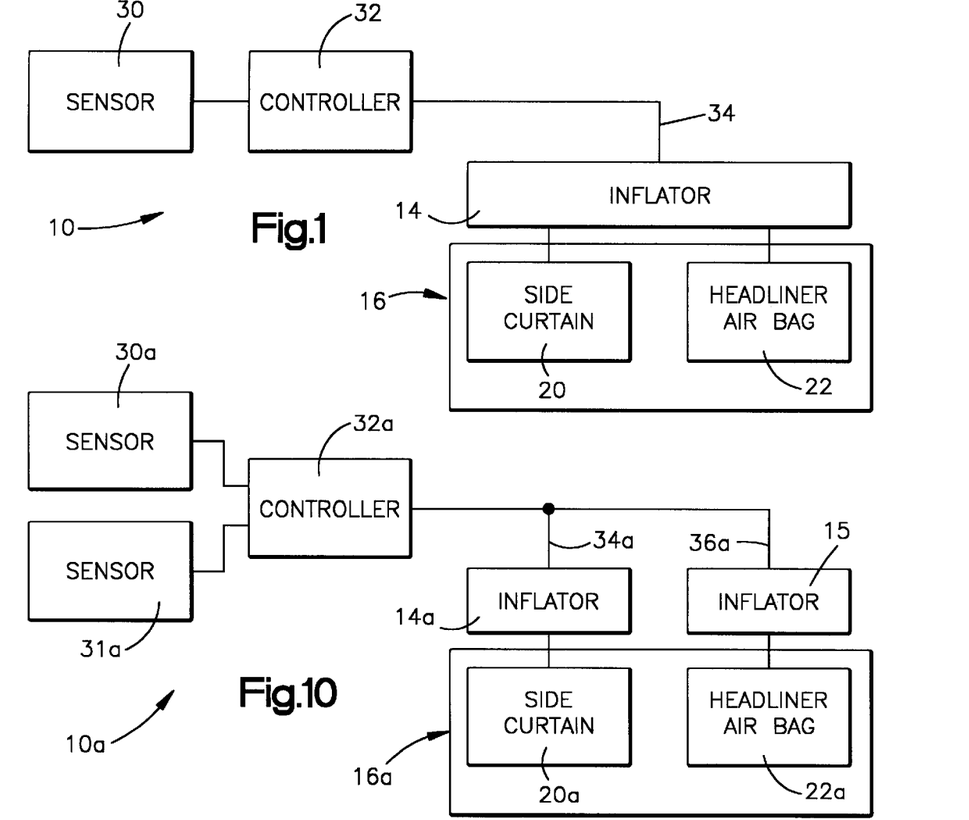
FIG. 1 is a schematic block diagram of a vehicle occupant safety apparatus in accordance with the present invention including an inflatable vehicle occupant protection device comprising a side curtain and a headliner air bag.
FIG. 10 is a view similar to FIG. 1 of a vehicle occupant safety apparatus in accordance with a second embodiment of the present invention.
Figure 2:
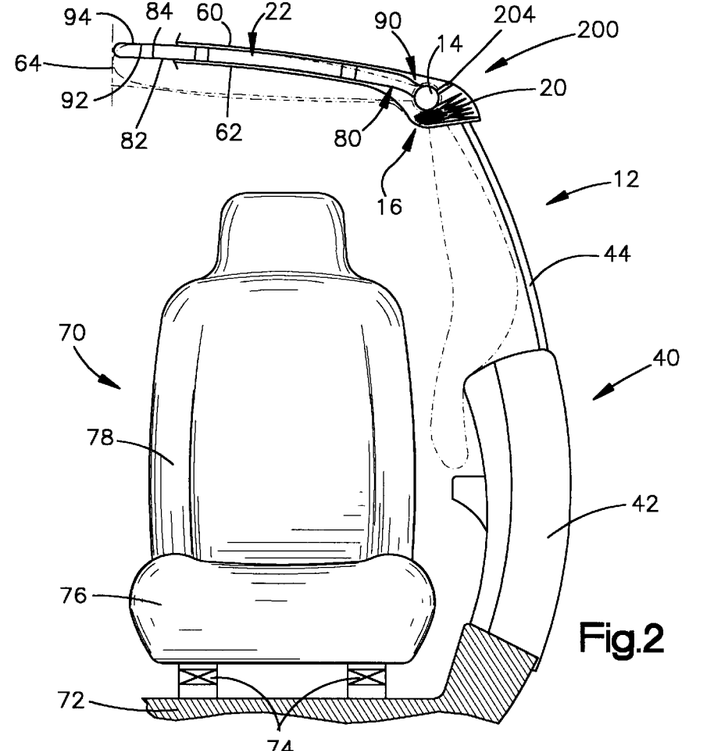
FIG. 2 is a front elevational view of a portion of a vehicle including the safety apparatus of FIG. 1, the protection device being shown in an uninflated condition.

The present invention relates to a vehicle occupant safety apparatus and, in particular, to a vehicle safety apparatus for helping to protect an occupant of a vehicle having a roof and a side structure. The present invention is applicable to various vehicle occupant safety apparatus constructions. As representative of the present invention, FIG. 1 illustrates schematically a vehicle occupant safety apparatus 10 for use in a vehicle 12 (FIG. 2).

The safety apparatus 10 (FIG. 1) includes an inflator 14 for inflating an inflatable vehicle occupant protection device 16. The protection device 16 includes a side portion or side curtain 20, and a head portion or headliner air bag 22, both described below in more detail.

The inflator 14 preferably contains a stored quantity of pressurized inflation fluid in the form of gas to inflate the protection device 16. The inflator 14 alternatively could contain a combination of pressurized inflation fluid and ignitable material for heating the inflation fluid, or could be a pyrotechnic inflator which uses the combustion of gas-generating material to generate inflation fluid.

The safety apparatus 10 includes a sensor 30 for sensing a vehicle condition such as a side impact to the vehicle 12 or a vehicle rollover condition. The safety apparatus 10 also includes a controller 32 for actuating the inflator 14 in response to the output of the sensor 30. Upon the occurrence of a vehicle condition for which inflation of the protection device 16 is desired to help protect the occupant of the vehicle 12, the sensor 30 and the controller 32 cooperate to send an actuation signal to the inflator over lead wires 34. The inflator 14 is actuated in a manner described below to inflate the protection device 16.

Figure 8:
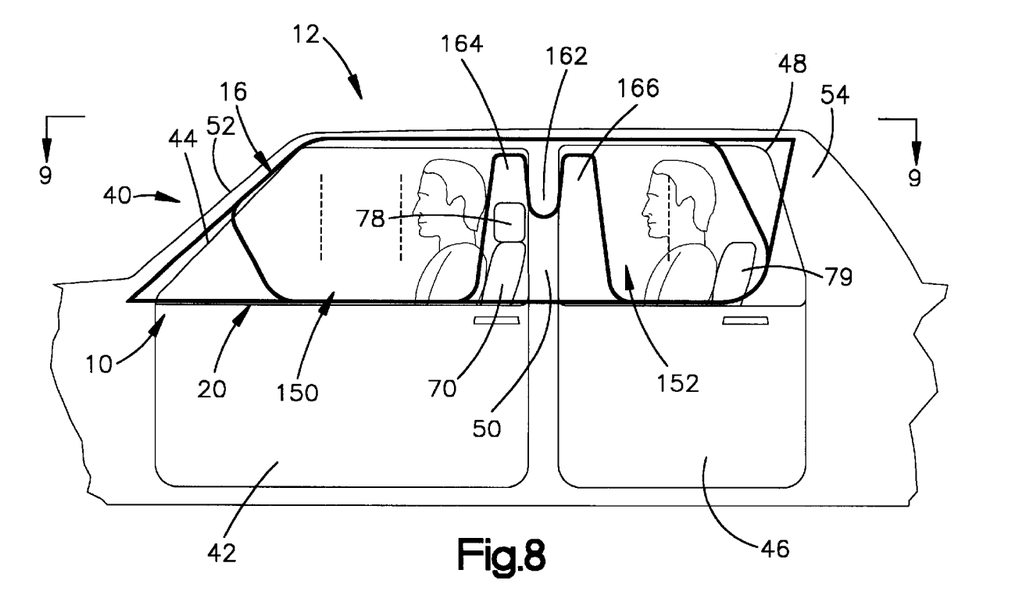
FIG. 8 is a schematic elevational view of the vehicle showing the protection device in an inflated condition.
Figure 9:
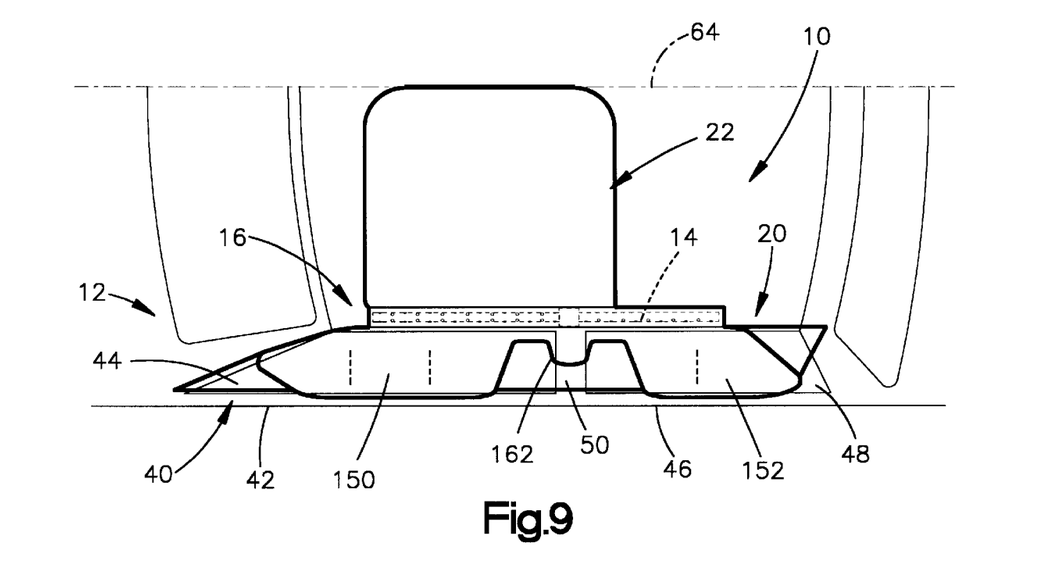
FIG. 9 is a schematic top plan view of the vehicle showing the protection device in an inflated condition.

The vehicle 12 includes a side structure 40 (FIGS. 2 and 8). The vehicle side structure 40 includes a front door 42 and a front side window 44. The vehicle side structure 40 also includes a back door 46 and a back side window 48. The vehicle B-pillar 50 is disposed between the front side window 44 and the back side window 48. The side structure 40 also includes the vehicle A-pillar 52 and C-pillar 54.

The vehicle 12 has a roof or roof panel 60 inside of which is supported a headliner 62. The headliner 62 extends generally parallel to the roof panel 60. The roof panel 60 and the headliner 62 both extend laterally in the vehicle 12, from the vehicle side structure 40 past the vehicle centerline 64.

A front seat 70 of the vehicle 12 is supported on the vehicle floor 72 by tracks 74. The seat 70 includes a seat bottom cushion 76 and a seatback 78. When a vehicle occupant (shown in FIG. 8 only) sits in the seat 70, the occupant is adjacent to the vehicle front door 42 and window 44. The side of the occupant's head is adjacent to the front side window 44. The top of the occupant's head is adjacent to the headliner 62. The vehicle 12 also has a back seat 79 (FIG. 8).

The protection device 16 is made from an inner panel 80 and an outer panel 90. The panels 80 and 90 are preferably made from a fabric material, such as woven nylon. The panels 80 and 90 may, alternatively, be made from another type of material, such as plastic film.

The inner panel 80 (FIG. 2) has an inner side surface 82 which is presented toward the headliner and an outer side surface 84 which is presented toward the outer panel 90. The inner panel 80 includes a head section 86 (FIG. 4) and a side section 88.

The outer panel 90 is substantially identical in configuration to the inner panel 80. The outer panel 90 has an inner side surface 92 (FIG. 2) which is presented toward the inner panel 80 and an outer side surface 94 which is presented toward the roof 60. The outer panel includes a head section 96 (FIG. 5) and a side section 98.

The head section 86 of the inner panel 80 (FIG. 4) has a generally rectangular configuration including a forward edge portion 100 and a rearward edge portion 102. The head section 86 also has an inner edge portion 104 and an outer edge portion 106. The outer edge portion 106 of the head section 86 merges with the side section 88 of the inner panel 80.

Figure 4:
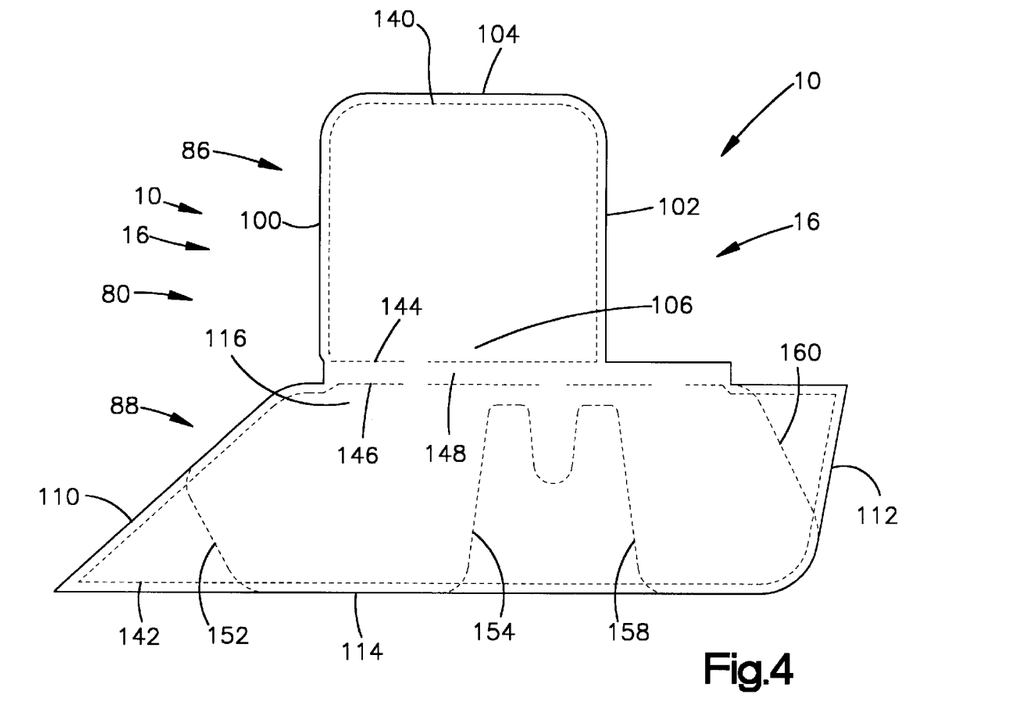
FIG. 4 is a plan view of an inner panel which forms one portion of the protection device.

The side section 88 of the inner panel 80 has an elongate, generally trapezoidal configuration including a forward edge portion 110 and a rearward edge portion 112. The side section 88 of the inner panel 80 also has a lower edge portion 114 and an upper edge portion 116. The upper edge portion 116 of the side section 88 merges with the head section 86 of the inner panel 80.

The head section 96 of the outer panel 90 (FIG. 5) has a generally rectangular configuration including a forward edge portion 120 and a rearward edge portion 122. The head section 96 also has an inner edge portion 124 and an outer edge portion 126. The outer edge portion 126 of the head section 96 merges with the side section 98 of the outer panel.

Figure 5:
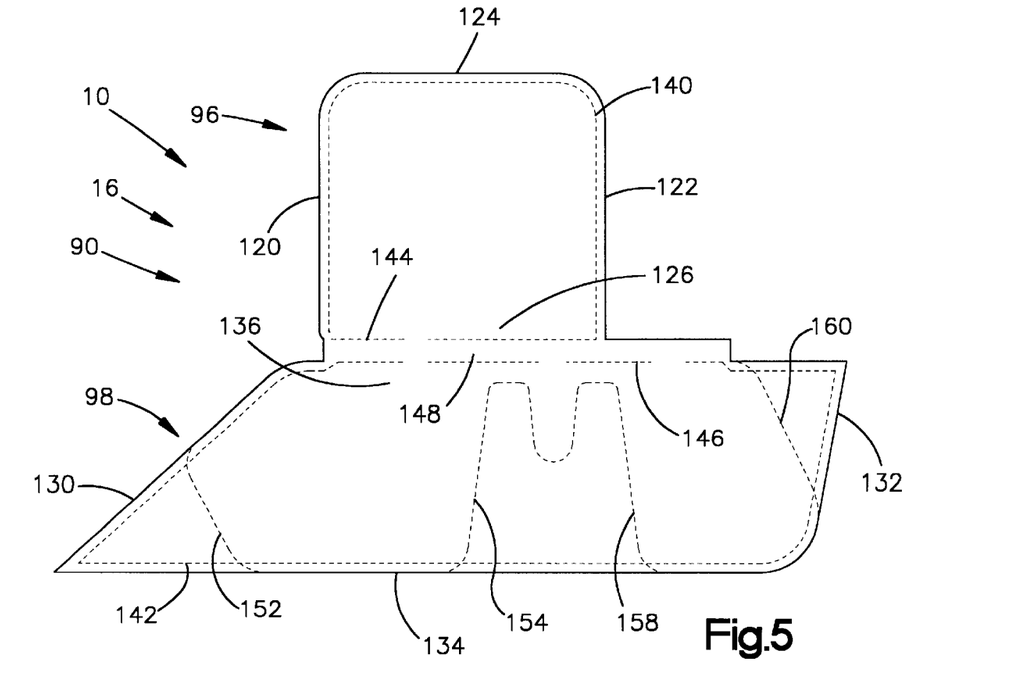
FIG. 5 is a plan view of an outer panel which forms another portion of the protection device.

The side section 98 of the outer panel 90 has an elongate, generally trapezoidal configuration including a forward edge portion 130 and a rearward edge portion 132. The side section 98 of the outer panel 90 also has a lower edge portion 134 and an upper edge portion 136. The upper edge portion 136 of the side section 98 merges with the head section 96 of the outer panel.

The inner panel 80 and the outer panel 90 are sewn together along a plurality of sew lines to form the protection device 16. One sew line 140 extends generally about the outer periphery of the head sections 86 and 96 of the inner and outer panels 80 and 90. Another sew line 142 extends generally about the outer periphery of the side sections 88 and 98 of the inner and outer panels 80 and 90. Parallel sew lines 144 and 146 at the area between the head sections 86 and 96 and the side sections 88 and 98 form an inflator channel 148 in the inflatable device. (It should be understood that each one of the sew lines in the protection device 16 may comprise a plurality of individual stitching sections, not merely one.)

The protection device 16 as thus formed includes the side curtain 20 and the headliner air bag 22. The side curtain 20 is made from only the side section 88 of the inner panel 80 and the side section 98 of the outer panel 90.

No other panels are included in the side curtain 20. The side curtain 20 includes an inflatable front window segment 150 (FIG. 3) which is defined by the sew lines 142 and additional sew lines 152 and 154. The side curtain includes an inflatable back window segment 156 which is defined by the sew line 142 and additional sew lines 158 and 160. An inflatable pillar segment 162 of the side curtain 20 is defined by the sew line 146 and additional sew lines 164 and 166.

Figure 3:
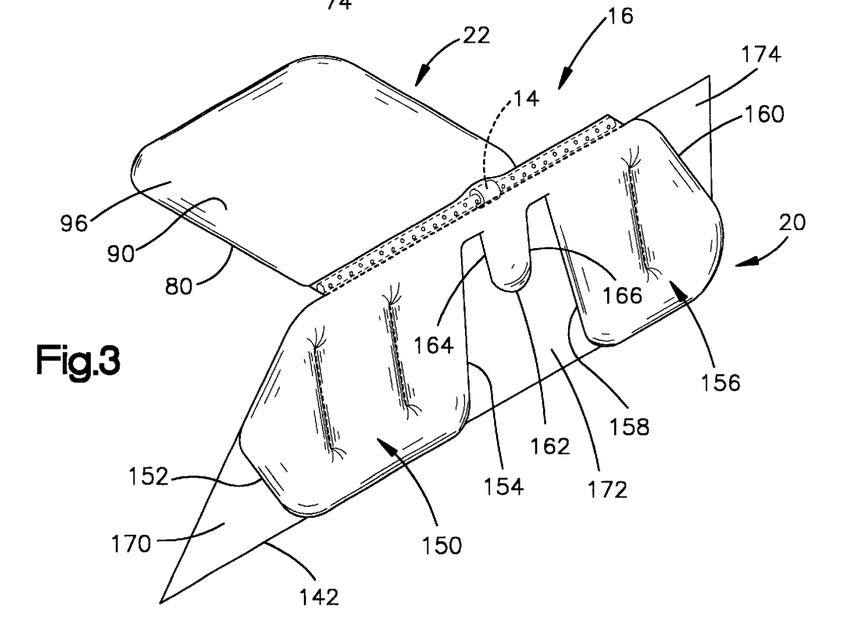
FIG. 3 is a perspective view of the protection device shown in an inflated condition.

The sew lines in the side portion 20 of the protection device 16 define three non-inflatable segments 170, 172 and 174 of the side curtain 20. The first or front non-inflatable segment 170 is connected with the vehicle A-pillar 52 and extends between the A-pillar and the inflatable front window segment 150. The second or middle non-inflatable segment 172 extends between the front inflatable segment 150 and the back window inflatable segment 156. The inflatable pillar segment 162 extends partially into the middle non-inflatable segment 172. The third or back non-inflatable segment 174 is connected with the vehicle C-pillar 54 and extends between the inflatable back window segment 156 and the C-pillar.

Figure 6:
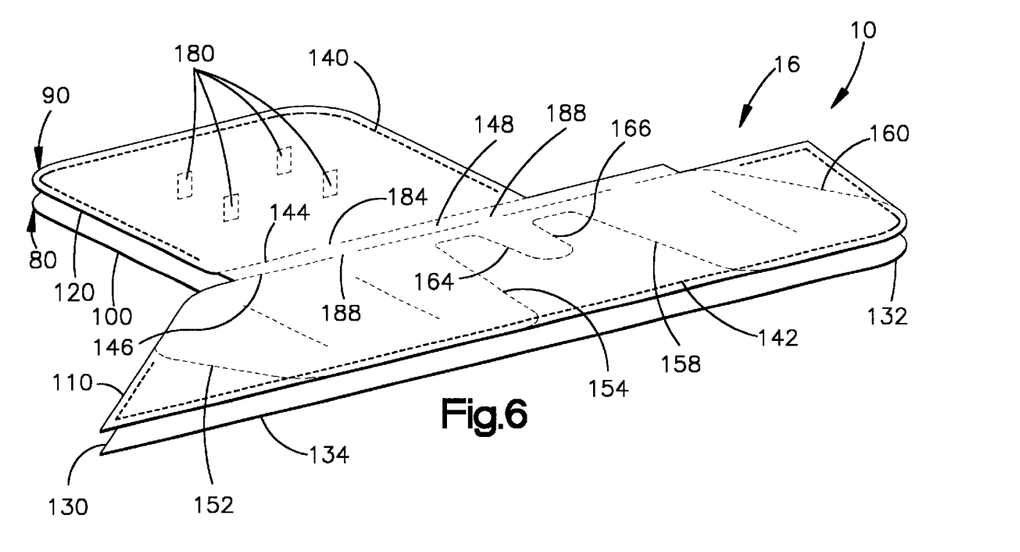
FIG. 6 is a perspective view of the inner and outer panels of the protection device.

The headliner air bag 22 is made from only the head section 86 of the inner panel 80 and the head section 96 of the outer panel 90. No other panels are included in the headliner air bag 22. The headliner air bag 22 may optionally include a plurality of tethers 180 (FIG. 6) between the head section 86 of the inner panel 80 and the head section 96 of the outer panel 90. The tethers 180 control the thickness of the headliner air bag 22 when it is inflated.

Figure 7:
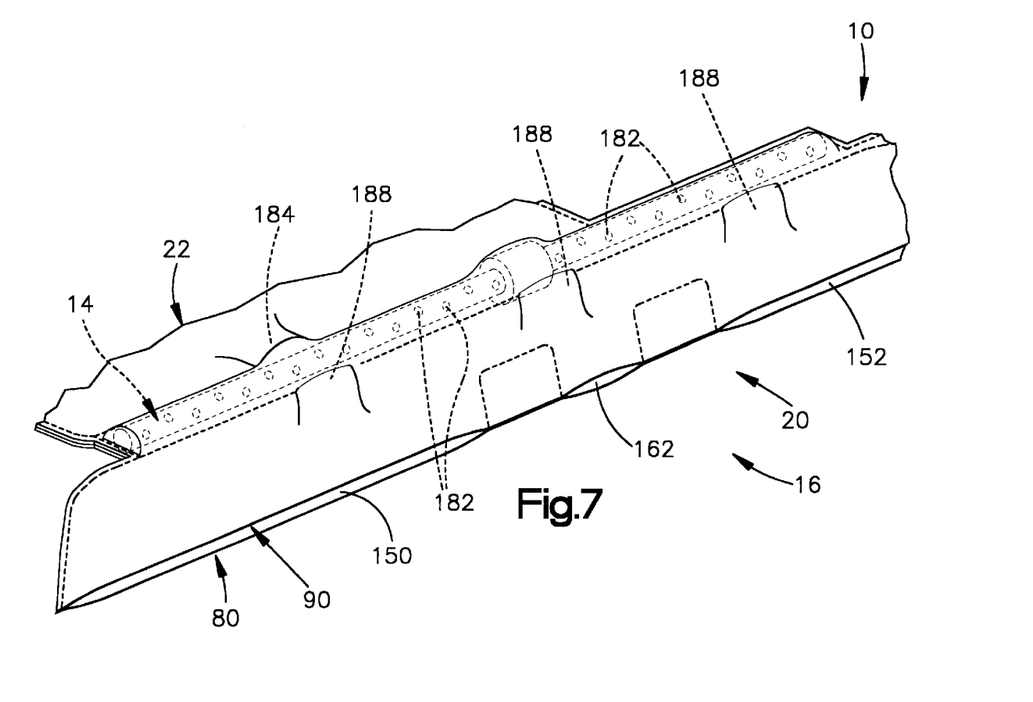
FIG. 7 is an enlarged perspective view showing a portion of the protection device assembled with an inflator.

The inflator 14 is mounted in the inflator channel 148 between the headliner air bag 22 and the side curtain 20. The inflator 14 is positioned adjacent the intersection of the side structure 40 of the vehicle 12 and the vehicle roof 60 (FIG. 2) and extends along a substantial portion of the length of the inflatable device 16 (FIG. 3). The inflator 14 has a plurality of nozzles or inflation fluid outlets 182 (FIG. 7) for directing inflation fluid into the inflatable device 16 to inflate the inflatable device.

The sew lines 144 and 146 which define the inflator channel 148 are discontinuous to form at least one opening 184 (FIGS. 6 and 7) which enables fluid to flow from the inflator 14 into the headliner air bag 22. The sew lines 144 and 146 are also discontinuous to form a plurality of openings 188 which enable fluid to flow from the inflator 14 into the side curtain 20.

The inflator 14 and the protection device 16 are mounted as a module 200 in the vehicle 12. As illustrated, the module 200 is mounted at the outboard side of the headliner 62, over the vehicle side structure 40. The module 200, or portions of the module including the inflator 14, may alternatively be mounted near the front of the vehicle 12, on or near the A-pillar 52, or at another location on the vehicle.

The module 200 includes means illustrated schematically at 204 (FIG. 2) for mounting the inflator 14 and the protection device 16 to the vehicle 12. The mounting means 204 is generally of a known construction and therefore is not illustrated in detail. The mounting means 204 may include one or more brackets or other fasteners for securing the module 200 in position on the vehicle 12.

The upper edge of the front non-inflatable segment 170 of the side curtain 20 is preferably connected with the A-pillar 52. The upper edge of the back non-inflatable segment 174 of the side curtain 20 is preferably connected with the C-pillar 54. The remainder of the side curtain 20 is stored in a deflated condition above the windows 42 and 46. The headliner air bag 22 is disposed in a generally flat condition between the roof panel 60 and the headliner 62. The head sections 86 and 96 lie generally parallel to each other and to the roof 60 and the headliner 62.

Upon the occurrence of a vehicle condition for which it is desired to help protect an occupant of the vehicle 12, such as a side impact to the vehicle or a rollover condition of the vehicle, the inflator 14 is actuated in a known manner by the controller 32. Inflation fluid is directed from the inflator 14 through the nozzles 182 of the inflator and into the side curtain 20. The side curtain 20 inflates generally vertically downward in the vehicle 12, inside the side structure 40 of the vehicle. Inflation fluid flows into the side curtain 20 in the same generally vertically downward direction in the vehicle.

The inflatable front window segment 150 of the side curtain 20 inflates to a position inside the front side window 44 of the vehicle 12. The inflatable back window segment 156 of the side curtain 20 inflates to a position inside the back side window 48 of the vehicle 12.

The middle non-inflatable segment 172 of the side curtain 20 is disposed generally laterally outward of the seatback 78 of the front seat 70. This enables the front window segment 150 of the side curtain to inflate laterally inward in the vehicle 12 without being restrained significantly by contact with the front seatback 78.

The inflatable pillar segment 162 of the side curtain 20 inflates to a position inside the B-pillar 50 of the vehicle 12. The pillar segment 162 of the side curtain 20 helps to protect against vehicle occupant contact with the B-pillar 50 of the vehicle 12, and also helps ensure proper inflation of the front and back inflatable segments 150 and 156 of the side curtain.

When the inflator 14 is actuated, inflation fluid is also directed through the nozzles 182 into the headliner air bag 22. The headliner air bag 22 inflates generally laterally in the vehicle, that is, in a direction transverse to the vehicle side structure 40 and between the roof panel 60 and the headliner 62, at a location above the seat 70. Inflation fluid flows into the headliner air bag 22 in the same generally lateral direction in the vehicle, transverse to the vehicle side structure. The roof panel 60 is more rigid than the headliner 62, so the headliner air bag 22 tends to inflate by pushing the headliner toward the seat 70. The interposition of the headliner air bag 22 between the occupant's head and the vehicle roof 60 helps to protect the occupant from injury due to contact with the roof. The headliner air bag 22 may, alternatively, deploy through an opening in the headliner 62, rather than behind the headliner.

FIG. 10 is a view similar to FIG. 1 of a vehicle safety apparatus 10a constructed in accordance with a second embodiment of the invention. The safety apparatus 10a is similar in construction to the safety apparatus 10 (FIGS. 1–5) and similar parts are given the same reference numerals with the suffix "a" added for clarity.

The safety apparatus 10a (FIG. 10) includes two separate inflators 14a and 15, rather than the single inflator 14 of FIG. 1. The inflator 14a, when actuated, emits inflation fluid under pressure for inflating the side curtain 20a. The inflator 15, when actuated, emits inflation fluid under pressure for inflating the headliner air bag 22a. The inflators 14a and 15 may, alternatively, be separate, independently actuatable stages of a single inflator, rather than two separate inflators. The safety apparatus 10a (FIG. 10) also includes two separate sensors 30a and 31, for sensing a side impact condition of the vehicle 12a and a rollover condition of the vehicle, respectively.

A condition of the vehicle 12a which requires protection of the top of the vehicle occupant's head, that is, a rollover condition, typically develops over a longer period of time than a side impact condition. Therefore, the second inflator 15 may be actuated at a selected period of time after the actuation of the first inflator 14a. In addition, it may in some circumstances be desirable to actuate the second inflator 15, and thereby inflate the headliner air bag 22a, prior to (or even without) actuation of the first inflator 14a.

Figure 11:
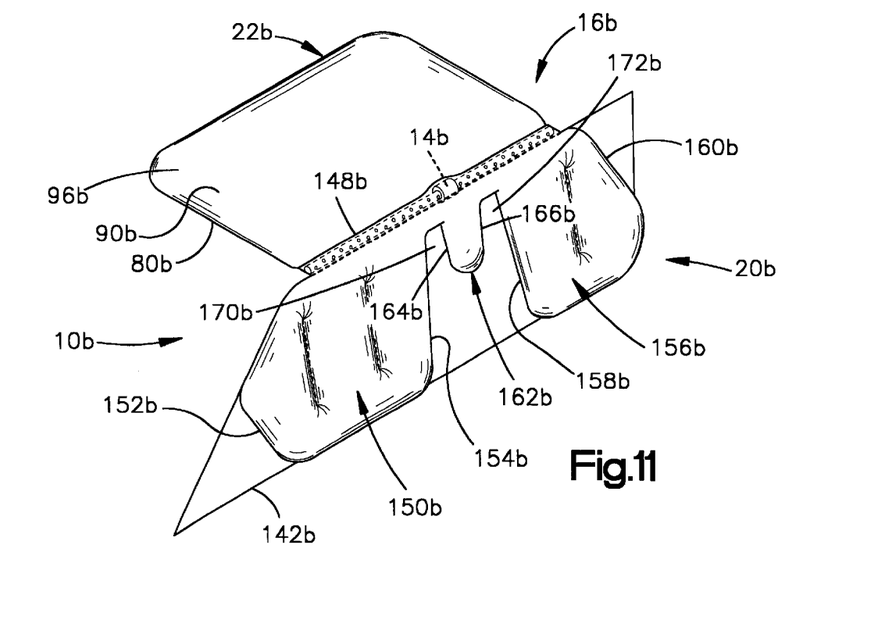
FIG. 11 is a view similar to FIG. 3 of a vehicle occupant safety apparatus in accordance with a third embodiment of the present invention.

FIG. 11 is a view similar to FIG. 3 of a vehicle safety apparatus 10b constructed in accordance with a third embodiment of the invention. The safety apparatus 10b is similar in construction to the safety apparatus 10 (FIGS. 1–5) and similar parts are given the same reference numerals with the suffix "b" added for clarity.

The safety apparatus 10b (FIG. 11) includes a headliner air bag 22b which extends over both the front seat area and the back seat area of the vehicle 12b. The headliner air bag 22b is disposed between a roof panel 60b and a headliner 62b (not shown) of the vehicle 12b. The inflator 14b, when actuated, emits inflation fluid under pressure for inflating the headliner air bag 22b and the side curtain 20b. The inflated headliner air bag 22b can help to protect both front and rear occupants of the vehicle 12b. The safety apparatus 10b may, alternatively, include two separate inflators, or separately actuatable stages of a single inflator, as discussed above with reference to the embodiment of FIG. 10.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant safety apparatus for helping to protect an occupant of a vehicle having a roof, a headliner underlying the roof, and a side structure including side window openings, said apparatus comprising:

an inflatable vehicle occupant protection device including a side curtain portion inflatable between the side structure of the vehicle and a vehicle occupant and a headliner portion inflatable between a roof of the vehicle and the vehicle headliner; and an inflation fluid source actuatable to provide inflation fluid for inflating said inflatable vehicle occupant protection device, said side curtain portion having a trapezoidal configuration with spaced parallel upper and lower edges and spaced front and rear edges extending between said upper and lower edges, said front edge extending at an acute angle to said lower edge, said upper edge lying entirely above the side window openings of the vehicle along the intersection of the side structure of the vehicle and the vehicle roof and said lower edge extending along the vehicle side structure adjacent a lower edge of a front side window opening and a lower edge of a rear side window opening when said side curtain portion is inflated, said headliner portion having a rectangular configuration including spaced parallel forward and rearward edges and spaced parallel inner and outer edges extending perpendicular to said forward and rearward edges and between said forward and rearward edges, said outer edge of said headliner portion extending parallel to and merging with said upper edge of said side curtain portion, said forward and rearward edges extending perpendicular to said upper edge at locations intermediate the terminal ends of said upper edge.

2. Apparatus as set forth in claim 1, wherein said side curtain portion when inflated extends from adjacent the intersection of the side structure of the vehicle and the vehicle roof to below the lower edges of the front and rear side window openings.

3. Apparatus as set forth in claim 1, wherein said side curtain portion overlies at least a portion of an A-pillar, B-pillar, and C-pillar of the vehicle.

4. Apparatus as set forth in claim 1 wherein said headliner portion extends from the vehicle side structure approximately to the vehicle centerline.

5. Apparatus as set forth in claim 1 wherein said inflatable vehicle occupant protection device comprises inner and outer panels each made from a single piece of material, said inner and outer panels having substantially identical shapes and being interconnected to define said side curtain portion and said headliner portion.

6. An apparatus as set forth in claim 5 wherein said headliner portion of said inflatable vehicle occupant protection device comprises a headliner section of said inner panel and a headliner section of said outer panel that lie generally parallel to each other and to a headliner of the vehicle between the headliner and the vehicle roof.

7. An apparatus as set forth in claim 5 wherein said side curtain portion comprises a side curtain section of said inner panel and a side curtain section of said outer panel.

8. Apparatus as set forth in claim 5 wherein said headliner portion comprises at least one tether for controlling the thickness of said head portion when said head portion is inflated, said at least one tether connecting an inner surface of said headliner section of said inner panel to an inner surface of said headliner section of said outer panel.

9. Apparatus as set forth in claim 1, wherein said headliner portion of said inflatable vehicle occupant protection device extends over a front seat area and a rear seat area of the vehicle.

10. Apparatus as recited in claim 1, wherein said side curtain portion comprises:
  an inflatable front window segment inflatable adjacent a front side window opening of the vehicle, said front window segment when inflated having an upper edge extending adjacent an upper edge of the front side window opening from adjacent an A-pillar of the vehicle to a position near a B-pillar of the vehicle, and a lower edge extending adjacent a lower edge of the front side window opening;
  an inflatable rear window segment inflatable adjacent a rear side window opening of the vehicle, said rear window segment when inflated having an upper edge extending adjacent an upper edge of the rear side window opening and a lower edge extending adjacent a lower edge of the front side window opening; and
  an inflatable pillar segment inflatable adjacent a B-pillar of the vehicle, said pillar segment when inflated extending from just forward of the B-pillar to just rearward of the B-pillar and extending from adjacent the vehicle roof to a position less than half the distance between the upper and lower edges of the side window openings.

11. Apparatus as recited in claim 10, wherein said side curtain portion further comprises a front non-inflatable segment having a generally triangular shape, said front non-inflatable segment comprising:
  a front edge comprising a portion of said front edge of said side curtain portion, said front edge of said front non-inflatable segment being connected to the A-pillar of the vehicle;
  a lower edge intersecting said front edge of said front non-inflatable portion at a location on the A-pillar adjacent the lower edge of the front side window opening, said lower edge of said front non-inflatable segment comprising a portion of said lower edge of said side curtain portion and extending parallel and adjacent the lower edge of the front side window opening from the A-pillar to said inflatable front window segment; and
  a rear edge extending between ends of said front and lower edges of said front non-inflatable segment opposite the intersection of said front and lower edges of said front non-inflatable segment, said rear edge of said front non-inflatable segment defining a portion of a front edge of said inflatable front window segment.

12. Apparatus as recited in claim 10, wherein said side curtain portion further comprises a rear non-inflatable segment having a generally triangular shape, said rear non-inflatable segment comprising:
  an upper edge comprising a portion of said upper edge of said side curtain portion, said upper edge of said rear non-inflatable segment having a first portion connected to the vehicle roof above the rear side window opening of the vehicle and a second portion connected to the C-pillar of the vehicle;
  a rear edge connected to the C-pillar of the vehicle and intersecting said second portion of said upper edge of said rear non-inflatable portion at a location on the C-pillar, said rear edge of said rear non-inflatable segment comprising a portion of said rear edge of said side curtain portion extending from the C-pillar to said inflatable rear window segment; and
  a forward edge extending between ends of said upper and rear edges of said rear non-inflatable segment opposite the intersection of said upper and rear edges of said rear non-inflatable segment, said forward edge of said rear non-inflatable segment defining a portion of a rear edge of said inflatable rear window segment.

13. Apparatus as recited in claim 10, wherein said side curtain portion further comprises a middle non-inflatable segment extending from forward of the B-pillar adjacent a seatback portion of a front vehicle seat to rearward of the B-pillar, said middle non-inflatable segment comprising:
  an upper edge comprising a portion of said upper edge of said side curtain portion, said upper edge of said middle non-inflatable segment having a first portion extending adjacent the upper edge of the front side window opening forward of the B-pillar, a second portion extending adjacent the upper edge of the rear side window opening rearward of the B-pillar, and a third portion extending between said first and second portions of said upper edge of said middle non-inflatable portion having a U-shaped configuration and overlying the B-pillar;
  a lower edge comprising a portion of said lower edge of said side curtain portion extending from an intersection of a rear edge of said inflatable front window segment and the lower edge of said inflatable front window segment to an intersection of a front edge of said inflatable rear window segment and the lower edge of said inflatable rear window segment;
  a forward edge extending between said upper and lower edges of said middle non-inflatable segment, said forward edge of said middle non-inflatable segment defining said rear edge of said inflatable front window segment; and
  a rearward edge extending between said upper and lower edges of said middle non-inflatable segment, said rearward edge of said middle non-inflatable segment defining said forward edge of said inflatable rear window segment.

14. Apparatus as recited in claim 1, wherein said inflatable vehicle occupant protection device further includes an inflator receiving channel for receiving said inflation fluid source, said inflator receiving channel extending parallel to said upper edge of said side curtain portion and said outer edge of said headliner portion along the length of said inflatable vehicle occupant protection device where said upper edge of said side curtain portion merges with said outer edge of said headliner portion.

15. Apparatus as set forth in claim 1, wherein said inflation fluid source comprises a plurality of first and second outlet apertures,
  said first outlet apertures being for directing inflation fluid to flow in a first direction from said inflation fluid source, said first direction being perpendicular to a longitudinal axis of said inflation fluid source, said second outlet apertures being for directing inflation fluid to flow in a second direction from said inflation fluid source, said second direction being perpendicular to the longitudinal axis of said inflation fluid source and perpendicular to said first direction, said inflation fluid source being positioned such that inflation fluid flowing from said first outlet apertures in said first direction is directed parallel to the vehicle roof to inflate said headliner portion of said inflatable vehicle occupant protection device, said inflation fluid source also being positioned such that inflation fluid flowing from said second outlet apertures in said second direction is directed parallel to the vehicle side structure to inflate said side curtain portion of said inflatable vehicle occupant protection device.

16. A vehicle occupant safety apparatus for helping to protect an occupant of a vehicle having a roof, a headliner underlying the roof, and a side structure including side window openings, said apparatus comprising:

an inflatable vehicle occupant protection device and an inflation fluid source actuatable to provide inflation fluid for inflating said inflatable vehicle occupant protection device from a deflated condition to an inflated condition, said inflatable vehicle occupant protection device consisting essentially of overlying inner and outer panels each constructed of a single piece of material and having a substantially identical shape and stitching interconnecting said inner panel with said outer panel to define portions of said inflatable vehicle occupant protection device, said portions comprising:

a side curtain portion having a trapezoidal configuration with spaced parallel upper and lower edges and spaced front and rear edges extending between said upper and lower edges and extending at acute angles relative to said lower edge, said upper edge extending entirely above the side window openings of the vehicle along the intersection of the side structure of the vehicle and the vehicle roof, said lower edge extending along the vehicle side structure adjacent a lower edge of a front side window opening and a lower edge of a rear side window opening when said side curtain portion is inflated, and a headliner portion having a rectangular configuration including spaced parallel forward and rearward edges and spaced parallel inner and outer edges extending perpendicular to said forward and rearward edges and between said forward and rearward edges, said outer edge of said headliner portion extending parallel to and merging with said upper edge of said side curtain portion.

* * * * *